United States Patent [19]

Virta et al.

[11] Patent Number: 5,349,627
[45] Date of Patent: Sep. 20, 1994

[54] METHOD AND APPARATUS FOR MARKING A FILM IN A DARK ROOM

[75] Inventors: Arto Virta, Helsinki; Pekka Strömmer, Espoo; Juha Sormunen, Sievi, all of Finland

[73] Assignee: Planmeca Oy, Finland

[21] Appl. No.: 18,788

[22] Filed: Feb. 17, 1993

[30] Foreign Application Priority Data

Feb. 26, 1992 [FI] Finland ............................ 920864

[51] Int. Cl.$^5$ ............................................ H05G 1/28
[52] U.S. Cl. .................................... 378/166; 378/162
[58] Field of Search ...................... 378/166, 165, 162

[56] References Cited

U.S. PATENT DOCUMENTS 4,860,330 8/1989 Strommer et al. ................. 378/166
4,983,991 1/1991 Palonen .

FOREIGN PATENT DOCUMENTS 3435309 11/1985 Fed. Rep. of Germany .
1570884 9/1980 United Kingdom .

*Primary Examiner*—Craig E. Church
*Attorney, Agent, or Firm*—Jones & Askew

[57] ABSTRACT

The invention concerns a method and an apparatus for marking a radiographic film in a dark room with patient data and/or similar information. The marks to be produced are made latent onto the film (F) in a form turning visible during the development of the film (F). The film (F) to be marked is transferred linearly in the marking apparatus, while the film (F) is simultaneously subjected to exposing marking radiation. The marking characters to be formed are sequentially composed from vertically adjacently placed elements ($C_1 \ldots C_N$) using the above-mentioned linear motion of the film (F) as the shift in the direction of the marking character row. In conjunction with the entry of patient data, the identification information for the film cassette to be marked is entered from a keyboard such as a cassette number which is marked on the cassette in a form visible in the dark. The identification information for the film cassette is shown by the marking apparatus so assuring the marking of the correct data onto the correct film.

12 Claims, 4 Drawing Sheets

METHOD AND APPARATUS FOR MARKING A FILM IN A DARK ROOM

The present invention relates to a method for marking a radiographic film or similar media in a dark room with patient data and/or other information, in which method the marks to be produced are made latent onto the film in a form turning visible during the development of the film.

Further, the invention concerns a dark-room marking apparatus suited to mark an exposed radiographic film with patient data and/or similar information, preferably on the margins of the film, said apparatus comprising a body frame with integral guidance members for the film.

Conventionally, radiographic films are subjected to diagnosis by a person other than the one who performs the radiographic exposure. To facilitate later identification of the exposures, the film is after the exposure marked with patient data, as well as other information pertinent to diagnostics, exposure conditions and archiving of the films.

Archiving of radiographic films is in many countries either compulsory by statutes or implemented voluntarily for follow-up examinations of the patient and other possible future examinations and treatments.

Markings on radiographic films are conventionally made either manually or using a purpose-built marking apparatus. Manual film labelling is usually performed after film development by sticking a paper label with the required information onto the film. Another manual marking method is to write the information onto a lead-foil sticker which is attached onto the film cassette prior to the radiographic exposure. During the exposure, the text written onto the lead-foil sticker is projected onto the radiographic film and becomes visible during the film development.

Such manual marking methods are handicapped by high material costs, long processing time and the possibility of marking a wrong film.

In certain types of prior-art marking apparatuses the information is first written on paper and the text is then projected with the help of a projector incorporated in the apparatus onto the x-ray exposed, as yet undeveloped radiographic film. The latent marking information is rendered visible during film development. The marking apparatus is placed in conjunction with the developing apparatus in the dark room. Several problems have been encountered with the use of dedicated marking equipment. Operation of the marking apparatus takes place in the dark which complicates its use. The marking strips used in the apparatus are disposable, which means extra costs. Moreover, the handling of the marking strips is awkward and poses the possibility of mistagged information, because the information is written remotely from the location of the marking apparatus.

The FI patent 81689 (corresponding EP patent publication 0,238,464 B1) filed by the applicant describes a marking method of radiographic films for panoramic tomography, said method being marketed under the trademark AUTOPRINT. According to the method the markings are made sequentially by realizing the horizontal row shift from the mutual motion of the exposing x-ray beam relative to the film and the film and the cassette containing the film, said motion being synchronized to the mutual motion between the x-ray beam exposing the radiographic image onto the film and the film.

In the apparatus according to the above-mentioned FI patent, the exposure of the film marking can be implemented with either light or x-ray beam. The vertical shift required for alphanumeric marking is implemented with a succession of holes drilled through a sliding gate. The x-ray beam or light passing through each separate hole can be timed in a desired manner either by closing and opening the hole or by turning on and off a light source adapted to each hole. Horizontal shift is achieved by drawing upon the linear or rotational motion of the film cassette of the radiographic apparatus.

According to the above-mentioned FI patent, the apparatus can be constructed to have a groove at the edge of the film cassette for guiding the motion of a drilled slide piece or sliding gate. Moving in synchronism with the sliding gate, a movable blind is provided that prevents film exposure on the marking area except at holes made in the sliding gate. With the motion of the film cassette, the position of the sliding gate moving along the groove on the cassette changes relative to the cassette and the contained film. Timing of the marking operation is synchronized with the motion of the film cassette. Timing of the exposure and the control or synchronization of the vertical and horizontal shifts for the generation of the marking characters is most appropriately handled with the help of a microcomputer. The patient data is entered from an external keyboard.

For the current state of the art concerning the invention, exemplifying reference is made to the following patent publications: U.S. Pat. Nos. 4,053,909, 4,962,464, DE-A1 3,031,100, DE-A1 3,614,957, WO81/01619 and EP-A2 0,432,722.

It is an object of the present invention to further develop the novel idea disclosed in the above cited FI patent and to extend its area of application so that the marking system according to the FI patent, known as the AUTOPRINT(TM) system, can be complemented with the novel dark-room marking system and apparatus according to the invention so that the marking of cephalometric images becomes possible, too. This is necessary because a panoramic radiographic apparatus is conventionally also used for imaging the skull when equipped with a cephalostat.

It is a further object of the invention to achieve a dark-room marking apparatus for radiographic films and similar media that is applicable as a stand-alone device for marking different kinds of radiographic films and similar media in a manner which overcomes the prior-art drawbacks described above and later in the text.

It is another further object of the present invention to achieve a novel dark-room marking system and apparatus connectable via, e.g., a serial connection to different types of radiographic imaging apparatuses, thus making it possible to mark different kinds of radiographic images such as panoramic images, mammographic images and cephalometric images in a dark room without using a special cassette for the film.

The invention makes it possible to implement such a marking system in which the panoramic images are marked in the dark room in a similar manner as cephalometric images. Then, the AUTOPRINT(TM) system described in the above cited FI patent can be simplified by omitting the special cassette and the marking head of the cassette assembly, whereby a highly advantageous apparatus is achieved for some dedicated applications.

With reference to the above described applications, it must be noted that the method and apparatus according to the invention also facilitates the implementation of a stand-alone type of apparatus. Moreover, the method and apparatus according to the invention can be integrated with different types of film development equipment.

A problem in the use of conventional marking methods and apparatuses for radiographic films has been created by the possibilities of confusion in exposed film cassettes and film orientation. In practice, information on the orientation of the film is also of importance, because a single cassette format (e.g. 18×24 cm or 24×30 cm) can be used in, e.g., cephalometric imaging for either vertical or horizontal image orientation. The person performing the marking of the film in the dark room must know how to orient the film at its feed into the marking apparatus so as to place the text to the right edge of the film, which is left unexposed by, for instance, cropping the exposed field or masking the film edge in the cassette during the exposure, or is otherwise suited for the marking purpose. It is a further object of the present invention to achieve novel solutions to such problems.

To attain the above-defined and later described goals, the method according to the invention is principally characterized in that the film to be marked is transferred essentially linearly in the marking apparatus, while the film is simultaneously subjected to an exposing marking radiation, and that the marking characters to be formed are sequentially composed from vertically adjacently placed elements using the above-mentioned linear motion of the film as the shift in the direction of the marking character row.

Furthermore, the apparatus according to the invention is principally characterized in that the above-mentioned guidance elements are connected with transfer elements for the film to be marked and a marking head adapted to contain an array of emitter elements with which the film to be marked can be sequentially exposed by the marking radiation as the film is transferred relative to said marking head with the help of said transfer elements.

The marking apparatus according to the invention is intended for operation in a dark room so that the film to be marked is removed from the film cassette and the marking operation is performed by entering the data to be marked from a dedicated keyboard of the apparatus, or by transferring the data entered from the keyboard or similar device of an external radiographic apparatus into the apparatus or its memory so that the data block to be marked on the film as well as the film and the film cassette are easily identifiable without risk of confusion.

In the apparatus according to the invention the film to be marked is transferred past the marking head in a dark room. The marks to be printed onto the film are advantageously formed from points, several of which are printed in the vertical and horizontal direction of the characters. The horizontal shift of the marking sequence is most advantageously obtained from the linear transfer motion of the film, and only in some exceptional cases from the relative motion between the marking head and the film, whereby the film is held stationary, but the marking head and/or the marking radiation is moved in the direction of the marking character row, or alternatively, both the marking head and the film are moved.

With the entry of patient data, the user also enters the number of the related cassette from the keyboard. The cassettes are provided with identification numbers which are visible in the dark. During dark-room operation the markings are performed in the order the marking information is stored in the memory of the marking apparatus computer, or alternatively, in the order the cassettes are stacked. The orientation information (vertical/ horizontal) of the film to be marked is presented along with the cassette number in the display of the marking apparatus. Thus, the user need not memorize the orientation information, because such information is maintained in the computer memory of the marking apparatus associated with the numeric information of the cassette. When the marking apparatus according to the invention is connected via a communications channel to, e.g., a panoramic apparatus or similar equipment, the orientation information is obtained automatically from the control system of the radiographic equipment, assuming that the equipment is provided with an automatic cephalostat blind. In such a system, the different blind positions are set to correspond to different orientations of the cassette. In applications which do not provide the orientation information from the radiographic apparatus control system, such as those requiring manual change of the blind, the orientation information can be entered from a keyboard in conjunction with the entry of the cassette number and patient name, whereby the user need no longer check such information in the dark room, but rather, the apparatus informs the user even if a longer time has elapsed between the exposure and the marking operation.

The invention is next examined in greater detail by making reference to the figures of the attached drawing which illustrate a few exemplifying embodiments of the present invention, whereby the illustrating details must not be construed to limit the .applications of the invention.

Figure 1:
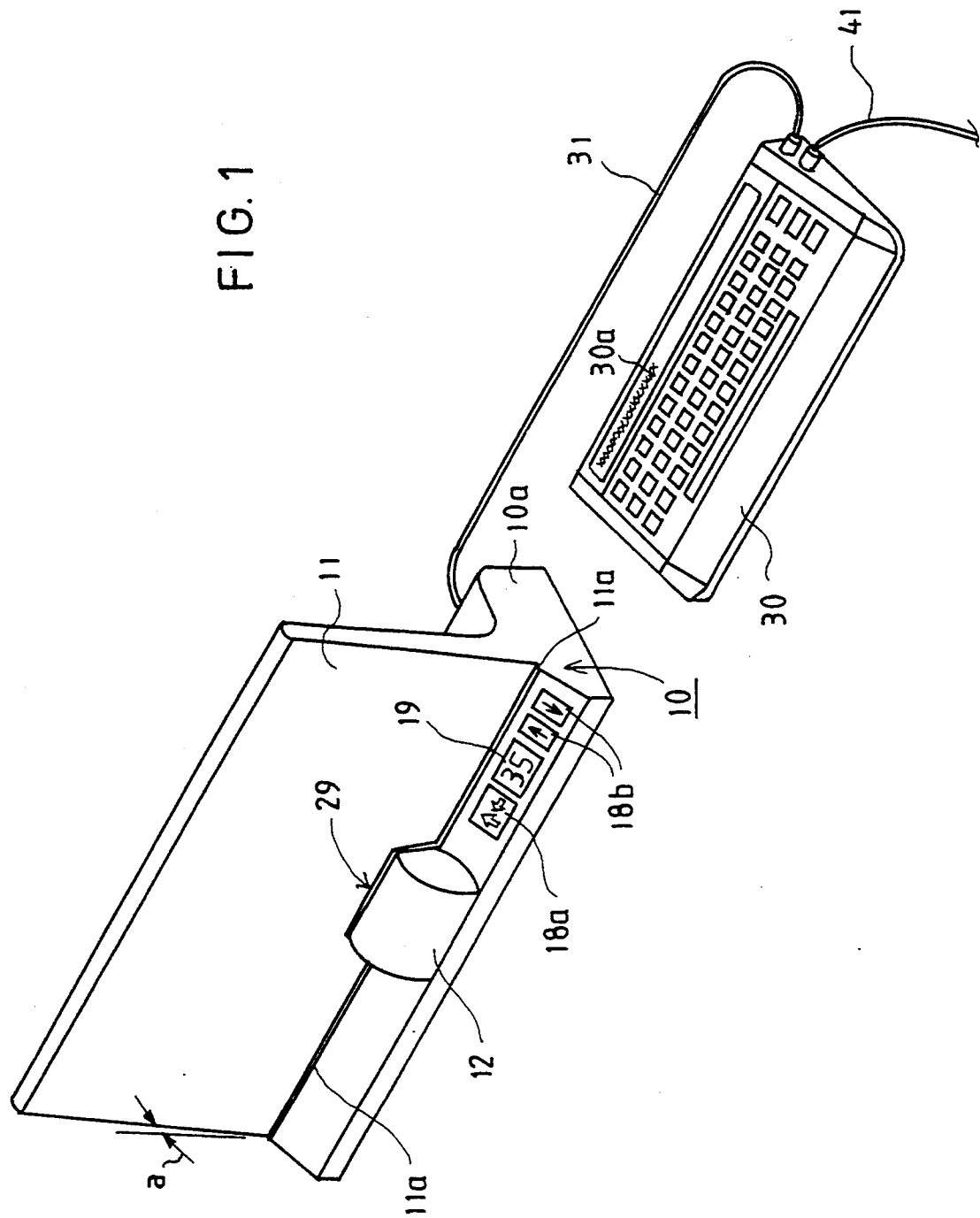
FIG. 1 shows an axonometric general view of a stand-alone apparatus according to the invention.

The marking apparatus according to the invention which is diagrammatically illustrated in FIG. 1 is employed in a dark room for marking exposed films prior to their development.

The apparatus comprises a basic unit 10 of the marking apparatus and a keyboard 30 attached to the basic unit via a cable 31, whereby the keyboard may also contain a display 30a for editing the marking information. The brightness level of the illumination for the keyboard and the displays 18,19 of the basic unit 10 must be dimmed to an appropriately low level for dark room operation. The basic unit 10 of the marking apparatus comprises a base 10a and an upwardly therefrom extending guidance plane 11 for the film F to be marked, whereby the side of the plane facing the operator is tilted backward by an angle a away from vertical.

Said angle a can be in the range $0° < a < 90°$, preferably a is approx. $5°\ldots 45°$.

Figure 2:
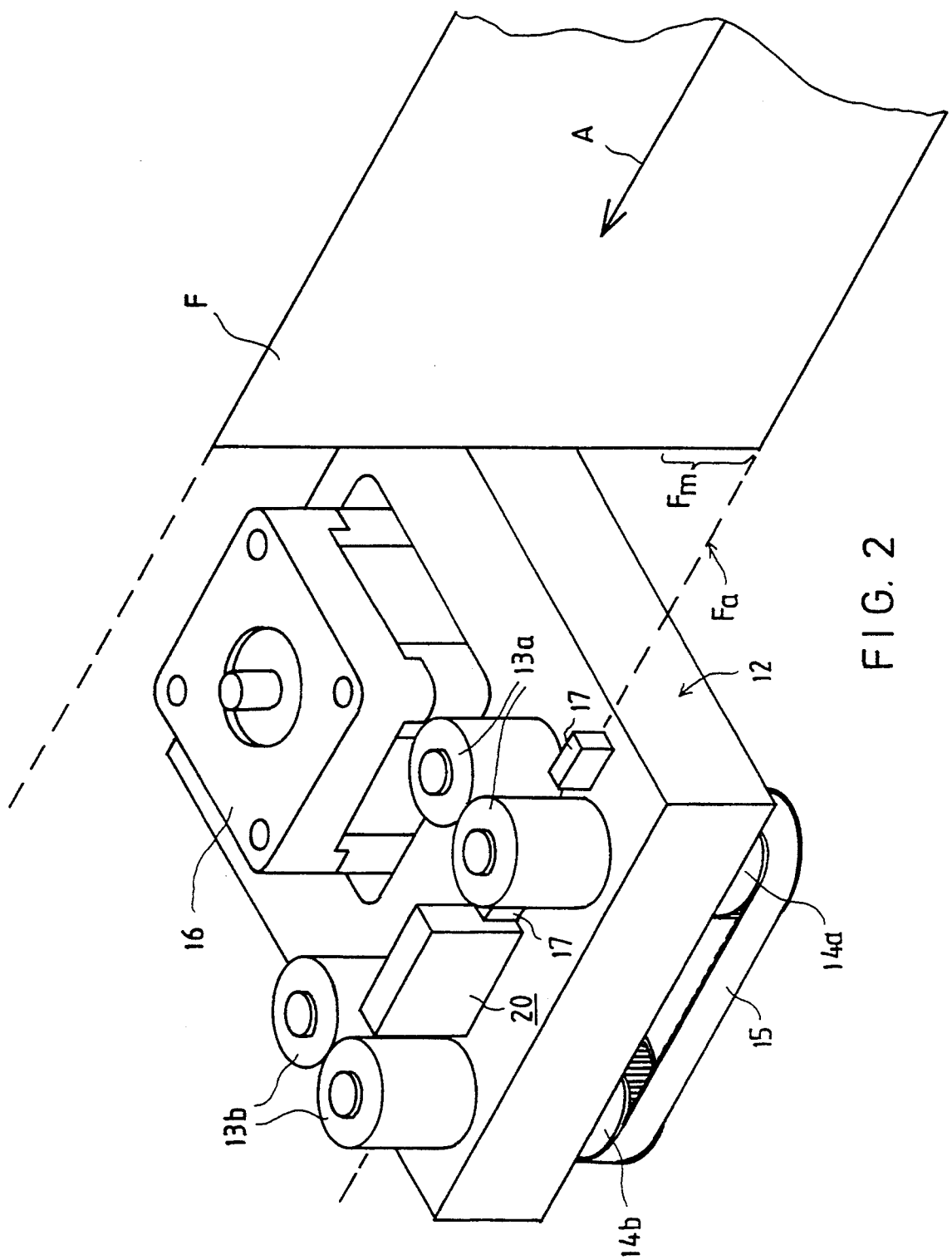
FIG. 2 shows an axonometric view of the film transfer mechanism and marking head according to the invention.

The lower end of the guidance plane 11 is provided with a horizontal guidance angle 11a or similar groove. According to FIG. 2, this angle 11a and the plane 11 guide the film F in the direction of arrow A into a marking slot 29 of the marking apparatus, the entry of said slot housing in the interior of the enclosure such film feed and marking arrangements as are diagrammatically illustrated in FIG. 2. When a radiographic film F guided by the angle 11a is introduced in the direction of arrow A into the marking slot 29, the leading edge of the film and the presence of the film are detected by, e.g., optical sensors 17 of which the first activates the rotation of a film transfer roll pair 13a. Between the film transfer roll pairs 13a and 13b is placed a marking head 20. The transfer rolls 13a and 13b are, e.g., elastic-rubber-coated rolls which are driven via gear wheels 14a and 14b connected by a toothed belt 15 to a stepper motor 16. The essential characteristic of the arrangement is that the stepper motor 16 is employed for horizontal shift of the film F so that the markings are made sequentially in a manner having the horizontal row shift realized by way of said linear motion of the film which is synchronized to the motion of the mark-exposing radiation source, preferably a light source. The marks to be printed onto the film are advantageously formed from discrete points, several of which are printed in both the vertical direction H and horizontal direction of the character row. The markings are made on the film in a defined area, typically at the lower edge $F_M$ of the film.

Figure 3:
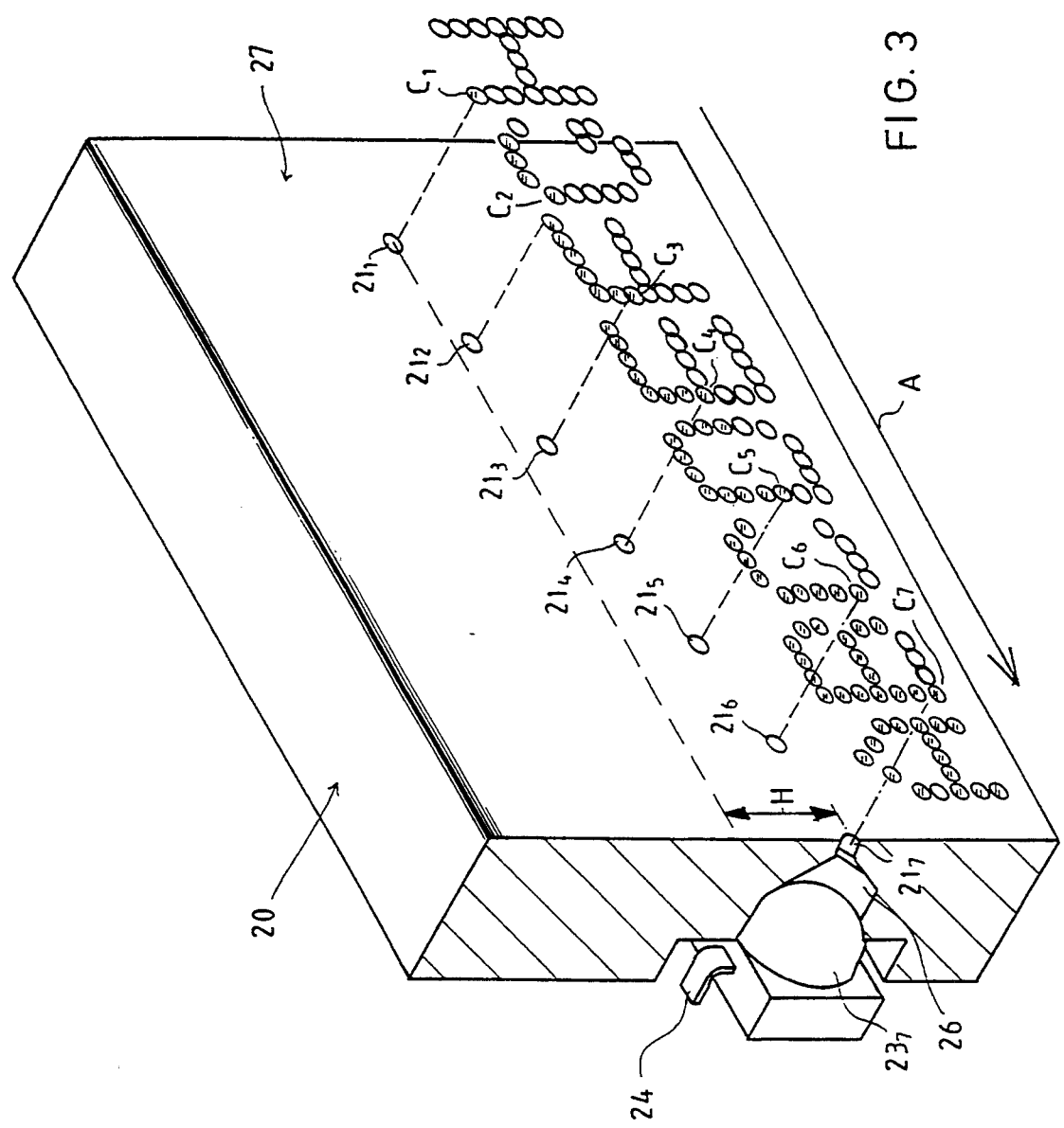
FIG. 3 shows a marking head for the apparatus according to the invention, implemented with an LED element.

FIG. 3 shows a preferred embodiment of the construction of the marking head 20 and its function. The marking head 20 incorporates a body piece 27 with an array of holes $21_1 \ldots 21_7$ placed in a slanted row relative to the feed direction A of the film F. The height difference H between the outermost holes $21_1$ and $21_7$ corresponds to the height of the characters A . . . H to be printed. According to FIG. 3 the holes 21 are widened by drilled recesses 26 into which an array of LEDs $23_1 \ldots 23_7$ is adapted, of which only the lowermost LED $23_7$ and its electrical connection 24 are shown. Light emitted from the LED array $23_1 \ldots 27_7$ is aimed through the hole array $21_1 \ldots 21_7$ onto the film F thus forming the marks to be printed sequentially and steppedly as illustrated in FIG. 3 when the film is moved in the direction of the arrow A. As shown in FIG. 3, the alphanumeric and other possible special characters to be printed are formed by point cell matrices $C_1 \ldots C_7$, of which the points of the uppermost row are exposed via the hole $21_1$ and so row by row down to the points of the lowermost row which are exposed via the hole $21_7$ according to the principles described in the above-cited FI patent 81689 when the film F is shifted by a stepper motor 16 driving the roll pairs 13a,13b. The exposed points of characters A . . . H are marked by black dots in FIG. 3. The structure of the marking head 20 is simple, because the light emitted from the LEDs 23 can be aimed directly through the holes 21 without resorting to the use of fiber optics.

The LED matrix 23 is driven according to a scheme in which the emitter elements of the matrix are turned on and off under the control of a CPU 37 so that each character is formed sequentially according to FIG. 3 as the film F moves in the direction of arrow A, that is, in the direction the character row is printed.

The horizontal spacing of the rolls 13a and 13b are selected such that even the smallest film sizes can be marked.

Several rows of text can be printed on the film F by, e.g., driving the film bidirectionally with the help of the rolls 13a,13b as many times as is necessary for the horizontal shifts of the marking operation. Thus, a number of the hole arrays $21_1 \ldots 21_N$ can be placed in a vertically parallelled array, and in special cases, also in a chained array.

Figure 4:
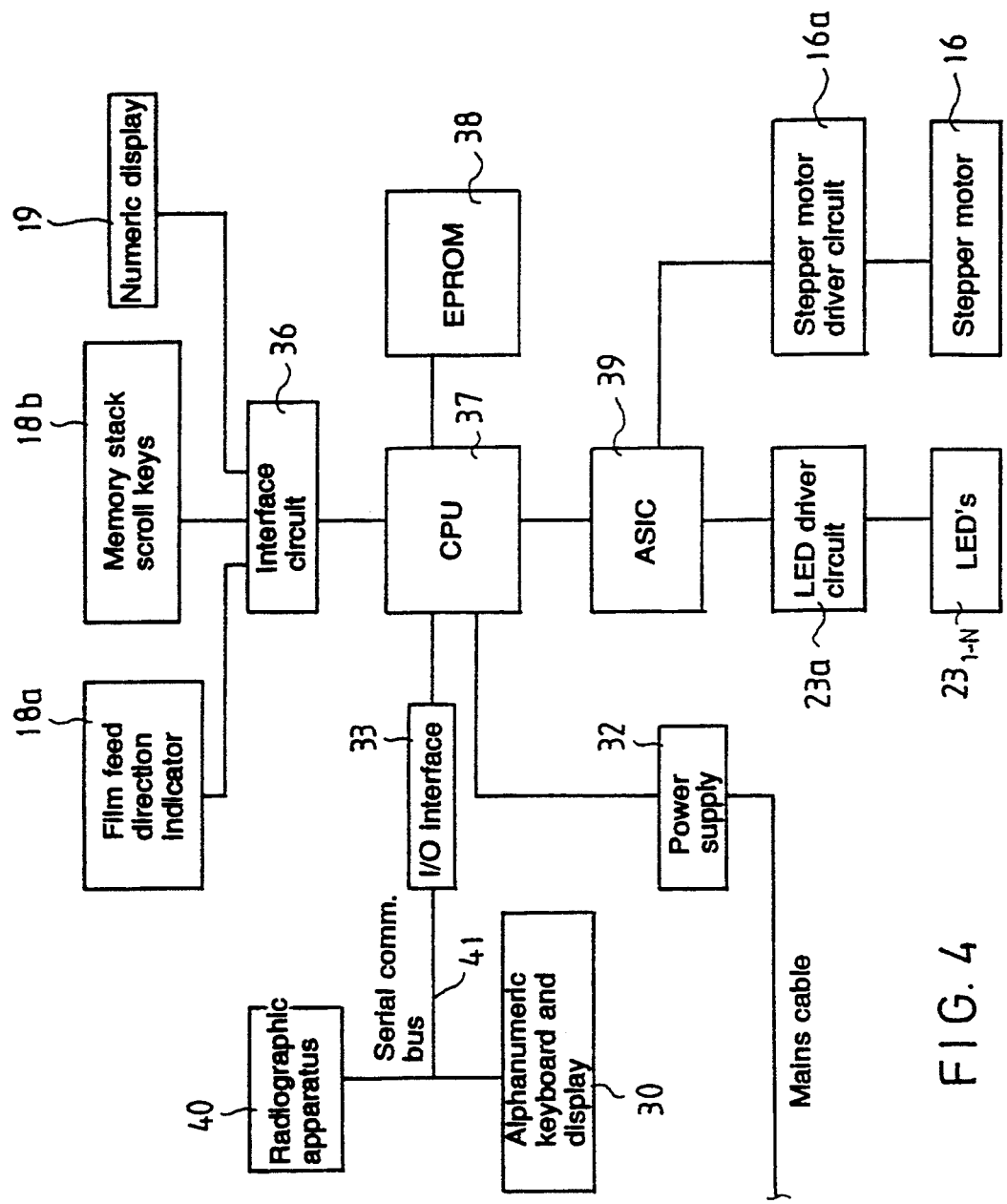
FIG. 4 shows the block diagram of an electronic control system for the apparatus according to the invention and the connection of the apparatus to the basic unit of a radiographic apparatus such as a panoramic radiographic apparatus or a mammographic apparatus.

FIG. 4 shows the block diagram of an electronic control system for the marking apparatus and the connection of the apparatus via a serial bus 41 to a radiographic apparatus 40, e.g., a panoramic radiographic apparatus of the type PM 2002 CC (TM) and/or a mammographic apparatus of the type Planmed SophieC (TM), both developed by the applicant. The marking apparatus comprises a CPU 37 and an EPROM 38. The radiographic apparatus 40 is connected via the serial bus 41 and an I/O interface 33 to the CPU 39. The entire apparatus is powered by a power supply 32. The basic unit 10 of the marking apparatus incorporates a numeric display 19, memory stack scroll keys 18b and an orientation indicator (horizontal/vertical) for the film F, that is, film feed direction indicator 18a, all of these elements communicating via an interface circuit 36 with the CPU. The elements 18a, 18b and 19 are also shown in FIG. 1. The CPU 37 controls an ASIC 39 which turns the LED array $23_1 \ldots 23_N$ on and off via an LED driver circuit 23a. Furthermore, the ASIC 39 controls, via a stepper motor driver circuit 16a, a stepper motor 16 which transfers the film F. The CPU 37 incorporates, i.a., an integrated circuit HC 11 which provides additional RAM space for the memory stack.

A film marking apparatus of the above-described type relieves the user from the need for keeping the films in a certain order. Instead, the film cassettes are provided with identifying numbers of such a nature that makes them visible in the dark room. Thus, the memory stack scroll keys 18b permit easy selection of marking data from the memory stack of film records for the film to be marked. Simultaneously, the display 19 shows the number of the cassette from which the film to be marked was most recently removed. Furthermore, the film orientation indicator 18a shows the proper feed direction for the film. When a horizontal arrow is shown by the indicator 18a, said film is fed into the marking apparatus with longer film edge oriented horizontal, and correspondingly, for a vertical arrow shown by the indicator 18a, the shorter film edge is oriented horizontal. The cassette number has already been entered in the system during the entry of patient data. The orientation information can thus be shown by the indicator 18a automatically linked with the cassette number. Operation with films originating from certain types of radiographic apparatuses in which the blind change is manual requires entry of orientation information from the keyboard in conjunction with the entry of cassette number and patient data. Even in such cases no hazard of misplaced information exists, because the indicator 18a always informs the dark-room operator even if a longer time has lapsed from the exposure to the marking instant.

The invention also concerns a stand-alone marking apparatus with a dedicated keyboard 30. Moreover, the scope of the invention covers such applications in which the marking apparatus 10 is connected via a serial bus 41 to a radiographic apparatus, whereby the keyboard incorporated in the radiographic apparatus, such as a panoramic radiographic apparatus, can be used for entering the data which later is printed onto the exposed film in the dark room.

Tests performed on a laboratory prototype apparatus prove the invention's capability of achieving an extremely high contrast which permits, when necessary, reduction of text character cell size down to 1×0.5 mm and offers good definition of the text even against a strongly exposed (density max. 2.3) background. Thus, also films exposed over their entire area such as intracranially taken radiographs can be marked. Technical arrangements permitting multirow marking are possible for applications in which the number of characters printable on a single row is insufficient. Further, vertical flipping or mirroring of the marking text can also be easily provided with a program option.

The claims of the patent application are presented in the following, whereby the different details of the invention may be varied and modified from those of the exemplifying embodiments within the scope of the claims defining the invention.

We claim:

1. A method for marking a radiographic film with patient data or similar information in a dark room after a radiographic exposure, in which method the marks to be produced are made latent onto the film (F) in a form becoming visible during the development of the film (F), comprising the steps of transferring the film (F) to be marked substantially linearly in a marking apparatus during a marking step in the dark room while simultaneously exposing the film to an array of vertically spaced sources of marking radiation;

sequentially composing the marking characters from vertically adjacently placed marks ($C_1 \ldots C_N$) using the above-mentioned linear motion of the film (F) as the shift in the direction of the marking character row;

guiding the film (F) horizontally supported by its lower edge; and transferring the film linearly in the horizontal direction past a marking head (20) of the marking apparatus while supporting the film on a plane inclined to a small angle ($\alpha$) from the vertical plane.

2. A method as defined in claim 1, characterized by connecting the marking apparatus (30) via a data transfer channel to a separate radiographic apparatus (40) such as a panoramic radiographic apparatus or a mammographic apparatus, whereby the keyboard incorporated in the radiographic apparatus can be used for entry of patient data and identification information of the film (F) into the marking system, and downloading the information to produce the markings during marking of the exposed film (F) in the dark room.

3. A method as defined in claim 1, characterized by entering the information to be marked in the marking apparatus from a dedicated keyboard (30) of the marking apparatus, said keyboard (30) being provided with a display (30a) for editing the entered marking information.

4. A method as defined in claim 1, characterized by producing the markings as point elements projected from a matrix of holes $21_1 \ldots 21_7$ adapted to contain emitters of radiation which can be controlled on and off.

5. A method as defined in claim 1, characterized by entering, with the patient data, identification information for a film cassette from a keyboard in a form visible in the dark, and showing the identification information for the film cassette by the marking apparatus, thereby assuring the marking of the correct data onto the correct film.

6. A method as defined in claim 5, characterized in that the marking apparatus incorporates an indicator (18a) for the proper feed direction of the film to be marked, and comprising the further step of driving said indicator in response to information linked to the cassette identification information or entered separately from a keyboard.

7. A dark-room marking apparatus, for marking patient data or other similar information on a predetermined area of an exposed radiographic film (F), said apparatus comprising:

a body frame (10a) with integral guidance members (11, 11a) for the film, said guidance members (11, 11a) including transfer elements (13a, 13b, 14a, 14b, 15, 16) for shifting along a predetermined horizontal path the film (F) to be marked after a radiographic exposure of the film;

a marking head (20) incorporating an array of vertically spaced emitter elements ($23_1 \ldots 23_7$) selectively operative to sequentially aim marking radiation onto the film (F) to be marked as the film is shifted past the marking head (20) with the help of said transfer elements (13a, 13b, 16);

the emitter elements being staggered in a direction perpendicular to the predetermined transfer path of the film so that the marking radiation from the emitter elements composes the marking characters on the film from adjacently placed marks ($C_1 \ldots C_N$) mutually spaced apart on the film in a direction perpendicular to the predetermined path as the film is shifted after exposure;

the guidance members for the film (F) to be marked comprise a horizontal angle (11a) and an adjoining guidance plane (11) which is inclined backward to a small angle ($\alpha$) from the vertical plane; and the transfer elements (13a, 13b) for the film (F) are placed close to said guidance members (11, 11a), with the film marking head (20) located between said transfer elements.

8. An apparatus as defined in claim 7, characterized in that the apparatus comprises a serial communication bus (41) and an I/O interface (33) and a CPU (37), and that the keyboard of a separate radiographic apparatus (40) can be connected via said serial communication bus (41) to the CPU (37) so that the identification information for the film (F) and the data to be marked can be entered from a radiographic apparatus (40) external to the darkroom marking apparatus (10).

9. An apparatus as defined in claim 7, characterized in that the marking head incorporates matrices of LED elements ($23_1 \ldots 23_7$) adapted in a row extending over the vertical height direction of the characters to be printed, and said elements being spaced at an essentially constant distance from each other so extending over the entire height (H) of the characters to be printed.

10. An apparatus as defined in claim 9, characterized in that the apparatus is provided with a numeric display (19) for the identification information of the film to be marked and an indicator (18a) showing the correct feed orientation (vertical/horizontal) for the film related to said identification information and that the apparatus is provided with keys (18b) for backward/forward scrolling of the stack of marking data and the identification numbers of the films on the numeric film ID display (19).

11. An apparatus as defined in claim 7, characterized in that the marking apparatus (10) incorporates a dedicated keyboard (30) and an integral display (30a) for the entry of information to the marking head (20).

12. An apparatus as defined in claim 7, characterized in that said film transfer elements comprise transfer roll pairs (13a), at least two pairs of said rolls being located at a close spacing between each other, that said transfer rolls (13a, 13b) are connected to a stepper motor (16) and that a marking head (20) is located between said pairs of transfer rolls, and that at least before the first transfer roll pair is located a sensor (17) for detection of film (F) presence and apparatus start-up.

* * * * *